(12) United States Patent
Pick et al.

(10) Patent No.: US 7,203,253 B2
(45) Date of Patent: Apr. 10, 2007

(54) METHOD AND APPARATUS OF CROSS-CORRELATION

(75) Inventors: Kobby Pick, Modiin (IL); Yona Perets, Ra'anana (IL)

(73) Assignee: Marvell World Trade Ltd., St. Michael (BB)

( * ) Notice: Subject to any disclaimer, the term of this patent is extended or adjusted under 35 U.S.C. 154(b) by 728 days.

(21) Appl. No.: 10/254,974

(22) Filed: Sep. 26, 2002

(65) Prior Publication Data

US 2004/0062324 A1     Apr. 1, 2004

(51) Int. Cl.
*H03D 3/22* (2006.01)
*H04L 27/22* (2006.01)

(52) U.S. Cl. .................. 375/332; 375/279; 375/322; 375/329; 329/304; 455/205

(58) Field of Classification Search ............... 375/332, 375/279, 322, 329; 329/205; 455/205
See application file for complete search history.

(56) References Cited

U.S. PATENT DOCUMENTS

| | | | | |
|---|---|---|---|---|
| 5,619,507 | A * | 4/1997 | Tsuda | 370/350 |
| 6,236,687 | B1 * | 5/2001 | Caso et al. | 375/327 |
| 6,404,821 | B1 * | 6/2002 | Dent | 375/267 |
| 6,563,858 | B1 * | 5/2003 | Fakatselis et al. | 375/148 |
| 2002/0095640 | A1 * | 7/2002 | Arad et al. | 714/792 |
| 2003/0067962 | A1 * | 4/2003 | Yellin | 375/130 |

FOREIGN PATENT DOCUMENTS

WO       WO 00/60738 A1    10/2000
WO       WO 01/03294 A1     1/2001

OTHER PUBLICATIONS

Towards implementation of a binary number system for complex numbers, Jamil, T, Southeastcon 2000. Proceedings of the IEEEpp. 268-274.*
The complex binary number system, Jamil, T.; Potentials, IEEE, vol. 20, Issue 5, Dec. 2001-Jan. 2002 pp. 39-41.*
Specific arithmetics in radices +/-4, Dao, T.T.; Multiple-Valued Logic, 1988., Proceedings of the Eighteenth International Symposium on May 24-26, 1988 pp. 134-139.*
Cross Correlation, http://en.wikipedia.org/wiki/Cross_correlation, Oct. 27, 2005.*
U.S. Appl. No. 09/974,921, filed Oct. 10, 2001, Daniel Yellin.
International search report of International application No. PCT/US 03/22500, dated Dec. 3, 2003.

* cited by examiner

*Primary Examiner*—Jay K. Patel
*Assistant Examiner*—Erin M. File

(57) ABSTRACT

Briefly, a method and apparatus to calculate cross-correlation values of complex binary sequences are provided. The apparatus may include a transformation unit and a cross-correlator. The cross-correlator may include a cross-correlation controller to provide, based on a type bit and a sign bit, a real component and/or an imaginary component of signals of complex binary sequences to a real accumulator and/or to an imaginary accumulator.

18 Claims, 2 Drawing Sheets

METHOD AND APPARATUS OF CROSS-CORRELATION

BACKGROUND OF THE INVENTION

In wireless communication systems such as spread spectrum cellular communication systems, cross-correlators may be used to perform cross correlation between streams of sequences of spread spectrum signals. For example, in cellular wideband code division multiple access (WCDMA) systems a spread spectrum signal may include a coding sequence, for example, a pseudo-random code. In cellular wideband code division multiple access (WCDMA) systems, the pseudo-random code may be an M-sequence or a Gold Sequence which has good "noise like" properties and is simple to construct. Furthermore, the sequences of the spread spectrum signal may be the product of a 64 chip Walsh code (aimed at separating up to 64 different users per base) and a periodic pseudorandom noise (PN) sequence (aimed at separating the different bases).

Cross-correlators may be used to perform cross-correlation between the streams of sequences. However, existing hardware implementations of cross-correlators may include a large number of components and may consume large currents.

Thus, there is a need for hardware and/or software implementations for calculating cross-correlation values to mitigate the above-described disadvantages.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
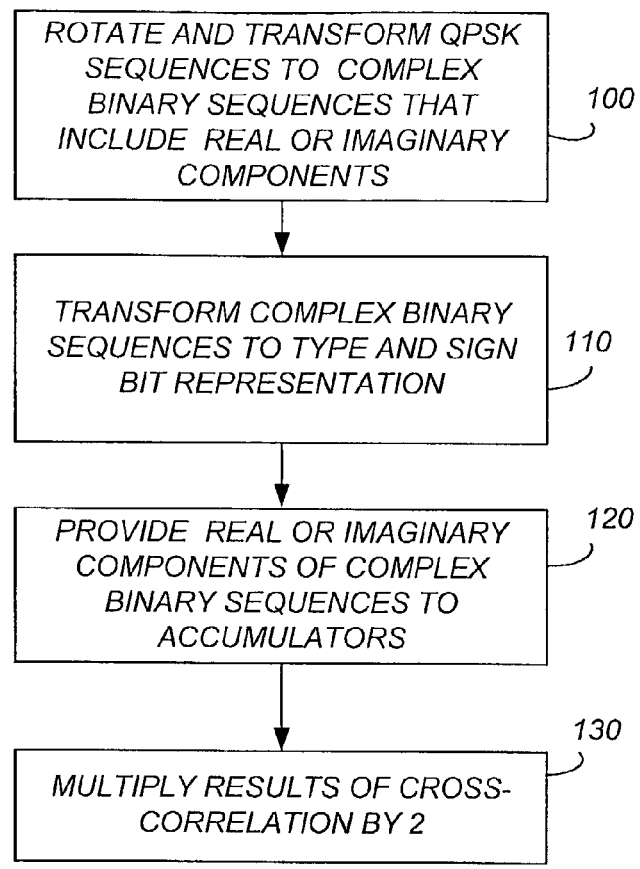
FIG. 1 is a schematic flowchart depicting a method according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description which follow are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

It should be understood that the present invention may be used in variety of applications. Although the present invention is not limited in this respect, the circuits and techniques disclosed herein may be used in many apparatuses such as-receivers of a radio system. Receivers intended to be included within the scope of the present invention include, by a way of example only, cellular radiotelephone receivers, spread spectrum receivers, digital system receivers and a like.

Types of cellular radiotelephone receivers intended to be within the scope of the present invention include, although not limited to, Code Division Multiple Access (CDMA), CDMA 2000 and wideband CDMA (WCDMA) cellular radiotelephone, receivers for receiving spread spectrum signals, and the like.

Tuning to FIG. 1, a method of cross-correlating between at least two signals of complex binary sequences according to an embodiment of the invention is shown. Although the scope of the present invention is not limited in this respect, the method may begin with transforming quadrature phase shift keying (QPSK) sequences into two signals of complex binary sequences (block 100), if desired.

Although the scope of the present invention is not limited in this respect, the transforming of QPSK sequences into two signals of complex binary sequences may be demonstrated by the following equations. The following equation may be used to calculate a complex cross correlation between two QPSK complex sequences:

$$CC(n,d) = \sum_{i=0}^{L-1} S_1(n+i) \cdot S_2^*(n+i+d) \quad \text{Equation 1}$$

wherein:

$S_1(n)$, $S_2(n)$ are two signals of complex sequences with given complex values of $\pm A \pm j \cdot A$;

L is the number of cross correlation terms; and d is the delay between the two sequences.

Equation 1 may be further developed in the following manner:

$$\begin{aligned} CC(n,d) &= \sum_{i=0}^{L-1} S_1(n+i) \cdot S_2^*(n+i+d) \\ &= 2 \cdot \sum_{i=0}^{L-1} \tilde{S}_1(n+i) \cdot \tilde{S}_2 \cdot (n+i+d) \end{aligned} \quad \text{Equation 2}$$

As demonstrated by Equation 2, the cross correlation sequences $S_1(n)$, $S_2(n)$ may be replaced by two signals of complex binary sequences $\tilde{S}_1(n)$, $\tilde{S}_2(n)$. The content of the signals $\tilde{S}_1(n)$, $\tilde{S}_2(n)$ may be depicted by the following equation:

$$\tilde{S}_{1I}(n)=(S_{1I}(n)+S_{1Q}(n))/2$$
$$\tilde{S}_{1Q}(n)=(-S_{1I}(n)+S_{1Q}(n))/2$$
$$\tilde{S}_{2I}(n)=(S_{2I}(n)+S_{2Q}(n))/2$$
$$\tilde{S}_{2Q}(n)=(-S_{2I}(n)+S_{2Q}(n))/2 \qquad \text{Equation 3}$$

wherein notation I may denote an in-phase component of signals $\tilde{S}_1(n)$, $\tilde{S}_2(n)$ and notation Q may denote a quadrature phase component of signals $\tilde{S}_1(n)$, $\tilde{S}_2(n)$. Furthermore, it should be known to one skilled in the art that notation I may represent a real component of signals $\tilde{S}_1(n)$, $\tilde{S}_2(n)$, and notation Q may represent an imaginary component of signals $\tilde{S}_1(n)$, $\tilde{S}_2(n)$ signals.

Although the scope of the present invention is not limited in this respect, transformation of QPSK sequences to complex binary sequences may be performed by $\pm(\pi/4)$ phase rotation of QPSK sequences, as described below with reference to FIG. 2.

Figure 2:
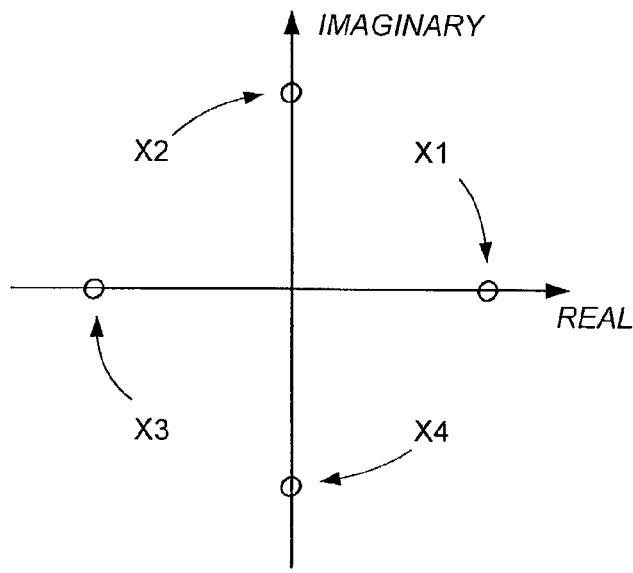
FIG. 2 is a schematic illustration helpful in understanding a phase rotation according to some exemplary embodiments of the present invention.

Turning to FIG. 2, an illustration helpful for describing rotation of QPSK sequences according to embodiments of the present invention is shown. Although the scope of the present invention is not limited in this respect, FIG. 2 shows $\pm(\pi/4)$ rotations of QPSK sequence values. However, in other embodiment of the present invention, $\pm(\pi/4)$ rotation of 16 quadrature amplitude modulation (QAM) sequences or other suitable forms of sequence rotation may be performed, if desired. More practically, QPSK values X1, X2, X3, and X4 may be rotated to be on either an imaginary axis or a real axis. For example, X1 may be rotated to be on the real axis, X2 may be rotated to be on the imaginary axis, X3 may be rotated to be on the real axis and X4 may be rotated to be on the imaginary axis. It should be understood to one skilled in the art that rotating of QPSK sequence values may be analogues to transforming of QPSK sequences to real or imaginary components of a complex binary sequence, if desired.

Furthermore, the rotation may be utilized to simplify the cross correlation calculations, as described by the following equation:

a rotation and transformation of the sequence X4 may generate a sign bit "minus" and a type bit "imaginary". Although the present invention is not limited in this respect, rotation and transformation of sequences may be performed in single operation, if desired. However, in other embodiments of the invention rotation and transformation may be performed by separate operations. In addition, in one embodiment of the present invention, the type bit and the sign bit may be used to provide a real component and/or an imaginary component of the complex binary sequences to real and/or imaginary accumulator, respectively (block 120).

Although the scope of the present invention is not limited in this respect, at least two accumulators may be used, a first accumulator may be used to output a real component of cross-correlation results and the second accumulator may be used to output an imaginary component of cross-con-elation results.

The cross-correlation results may be multiplied by two, as demonstrated by Equation 2 (block 130). It should be understood by one skilled in the art that the above described method may be implemented by hardware and/or by software. An example of an embodiment of the present invention that may use a combination of hardware and software will now be described.

Figure 3:
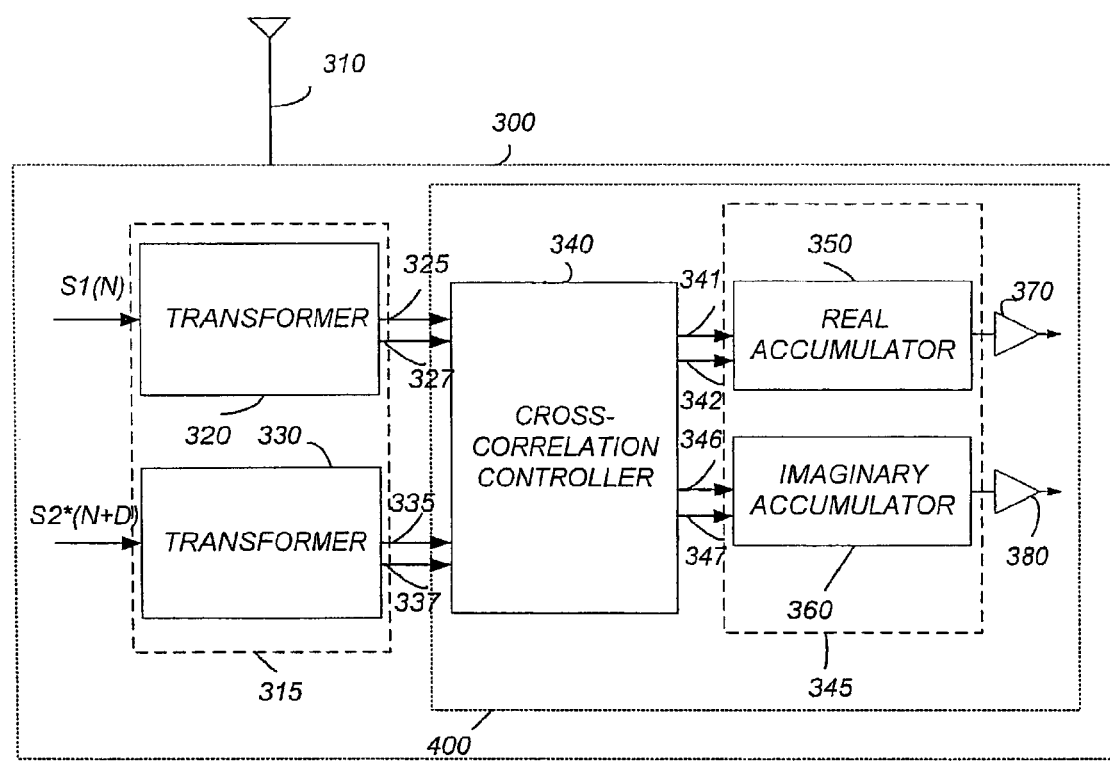
FIG. 3 is a schematic diagram of a receiver according to some exemplary embodiments of the present invention.

Turning to FIG. 3, a block diagram of a receiver 300 according to an embodiment of the present invention is shown. Although, the scope of the present invention is not limited in this respect, receiver 300 may include an antenna 310, a transformation unit 315 that may include transformers 320, 330, and a cross-correlator 400. Cross-correlator 400 may include a cross-correlation controller 340, an accumulation Unit 345 that may include a real accumulator 350 and an imaginary accumulator 360 and amplifiers 370, 380.

Although the scope of the present invention is not limited to this example, for simplicity of description, receiver 300 will be described as a WCDMA receiver. Antenna 310 may receive signals, for example, pilot signal, dedicated channel signal, or the like, that may include QPSK sequences. In some embodiments of the present invention antenna 310 may be a dipole antenna, if desired. However, other types of antennas may be used.

A demodulator (not shown) may output two signals, S1(N) and S2*(N+D), of QPSK sequences. Transformers $$\tilde{S}_1(n+i)\cdot \tilde{S}_2^*(n+i+d) = \qquad \text{Equation 4}$$

$$\begin{cases} \tilde{S}_{1I}(n+i)\cdot \tilde{S}_{2I}(n+i+d) & S_{1I}(n+i) = S_{1Q}(n+i), S_{2I}(n+i+d) = S_{2Q}(n+i+d) \\ -j\cdot \tilde{S}_{1I}(n+i)\cdot \tilde{S}_{2Q}(n+i+d) & S_{1I}(n+i) = S_{1Q}(n+i), S_{2I}(n+i+d) \neq S_{2Q}(n+i+d) \\ j\cdot \tilde{S}_{1Q}(n+i)\cdot \tilde{S}_{2I}(n+i+d) & S_{1I}(n+i) \neq S_{1Q}(n+i), S_{2I}(n+i+d) = S_{2Q}(n+i+d) \\ \tilde{S}_{1Q}(n+i)\cdot \tilde{S}_{2Q}(n+i+d) & S_{1I}(n+i) \neq S_{1Q}(n+i), S_{2I}(n+i+d) \neq S_{2Q}(n+i+d) \end{cases}$$

As may be seen in Equation 4, the complex binary sequence signals $\tilde{S}_1(n)$, $\tilde{S}_2(n)$ are either purely real or purely imaginary, which may reduce the number of real and/or imaginary multiplications required for performing complex multiplication from four to one.

Turning back to FIG. 1, the method may continue with transforming a complex sequence into a sign bit and a type bit representation (block 110). For example, as shown in FIG. 2, a rotation and transformation of the value X1 may generate a sign bit "plus" and a type bit "real". Furthermore, 320 and 330 may receive signals S1(N) and S2*(N+D) of the QPSK sequences and may transform the QPSK sequences into two signals of complex binary sequences $\tilde{S}_1(n)$ and $\tilde{S}_2(n)$, respectively. The transformation of QPSK sequences to complex binary sequences may be performed by $\pm(\pi/4)$ phase rotation of the QPSK sequences, as described in detail with reference to FIG. 2 above. Furthermore, transformers 320 and 330 may provide control bits such as, for example, sign bits 325 and 335 and type bits 327 and 337, to cross-correlation controller 340.

Although the scope of the present invention is not limited in this respect, cross-correlation controller 340 may provide complex binary sequences via ports 341, 346 and may enable or disable accumulators 350, 370 with ports 342, 347, respectively. More particularly, cross-correlation controller 340 may selectively control which accumulator may be active, using enable signals via ports 342, 347, according to sign bits 325, 335 and type bits 327, 337. An example of such a selective control is described with reference to Table 1 below.

Although the scope of the present invention is not limited in this respect, in some embodiments of the present invention, a representation as shown in Table 1 below may be stored in a memory (not shown). In addition, in other embodiments of the present invention, a representation as shown in Table 1 below may be implemented by hardware and/or by software.

TABLE 1

| Index | Sign Bit (325) | Sign Bit (335) | Type Bit (327) | Type Bit (337) | Real Accumulator (350) Input | Real Accumulator (350) Enable | Image Accumulator (360) Input | Image Accumulator (360) Enable |
|---|---|---|---|---|---|---|---|---|
| 0 | Plus | Plus | Real | Real | A | On | — | Off |
| 1 | Plus | Plus | Real | Image | — | Off | A | On |
| 2 | Plus | Plus | Image | Real | — | Off | A | On |
| 3 | Plus | Plus | Image | Image | −A | On | — | Off |
| 4 | Plus | Minus | Real | Real | −A | On | — | Off |
| 5 | Plus | Minus | Real | Image | − | Off | −A | On |
| 6 | Plus | Minus | Image | Real | − | Off | −A | On |
| 7 | Plus | Minus | Image | Image | A | On | — | Off |
| 8 | Minus | Plus | Real | Real | −A | On | — | Off |
| 9 | Minus | Plus | Real | Image | — | Off | −A | On |
| 10 | Minus | Plus | Image | Real | — | Off | −A | On |
| 11 | Minus | Plus | Image | Image | A | On | — | Off |
| 12 | Minus | Minus | Real | Real | A | On | — | Off |
| 13 | Minus | Minus | Real | Image | — | Off | A | On |
| 14 | Minus | Minus | Image | Real | — | Off | A | On |
| 15 | Minus | Minus | Image | Image | −A | On | — | Off |

In Table 1 the following notation used:

"Index" represents indices of the complex binary sequence;

"Sign Bits" (325, 335) represent the sign of the transformed sequence;

"Type Bits" (335, 337) represent weather the transformed bit of the complex binary sequence is "Real" or "Image" (i.e., imaginary);

"Input" represent which binary sequence may be provided to which of the accumulators; and "Enable" represents whether or not the accumulator is enabled by the enable bit.

Although the scope of the present invention is not limited in this respect, cross-correlation controller 340 may select the complex binary sequences according to Table 1. The selected sequences may be inputted to the selected accumulators 350 and/or 360, to be accumulated. Real accumulator 350 and imaginary accumulator 360 may produce the total Real/Image cross correlation results, respectively.

In addition, accumulators 350 and 360 may include an up/down counter and an AND gate (not shown). The AND gate may enable the up/down counter operation. However, it should be understood that other accumulator implementations may be used. Although the scope of the present invention is not limited in this respect, multipliers 370, 380 may multiply the results of cross-correlation preformed by cross-correlation controller 340, real accumulator 350 and imaginary accumulator 360 by two, as depicted by Equation 2.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An apparatus comprising:
   a transformation unit to transform quadrature phase shift keying (QPSK) sequences of first and second input signals into fist and second signals of complex binary sequences; and
   a cross-correlator to cross-correlate the first and second signals of complex binary sequences based on a sign bit and a type bit provided by the transformation unit, said cross-correlator including
   an accumulation unit comprising a first accumulator to provide a real cross-correlated signal and a second accumulator to provide an imaginary cross-correlated signal, and
   a cross-correlation controller to provide a real component of the first and second signal of complex binary sequences to the first accumulator and an imaginary component of the first and second signal of complex binary sequences to the second accumulator.

2. The apparatus of claim 1, wherein the transformation unit comprises:
   a first transformer able to rotate a phase of QPSK sequences of the input signal to provide the type bit and the sign bit of the first signal of complex binary sequences that include real and imaginary components; and
   a second transformer able to rotate a phase of QPSK sequences of the second input signal to provide the type bit and the sign bit of the second signal of complex binary sequences that include real and imaginary components.

3. The apparatus of claim 1, wherein the cross-correlator further comprises:
   a first multiplier able to multiply the real cross-correlated signal; and
   a second multiplier able to multiply the imaginary cross-correlated signal.

4. The apparatus of claim 3, wherein the first and second multipliers are able to multiply the real and imaginary cross-correlated signals by two.

5. The apparatus of claim 2, wherein the first and second transformers are able to provide a phase rotation of $\pm(\pi/4)$ to bits of the first and second signals of complex binary sequences.

6. The apparatus of claim 2, wherein the fist and second signals of complex binary sequences comprise values of $\pm A$ and $\pm j \cdot A$.

7. A method comprising:
   cross-correlating between a first signal of complex binary sequences and a second signal of complex binary sequences according to a sign bit and a type bit provided by phase-rotating the complex binary sequences of the first and second signals: and
   transforming first and second input signals of quadrature phase shift keying (QPSK) sequences into said first and second signals of complex binary sequences, wherein transforming includes rotating a phase of the QPSK sequences of the first input signal and a phase of the QPSK sequences of the second input signal, and providing real and imaginary components of complex binary sequences of the first and second signals to real and imaginary accumulators, respectively.

8. The method of claim 7, wherein the cross-correlating comprises multiplying results of the cross-correlating by two.

9. The method of claim 7, wherein rotating comprises rotating a phase of the complex binary sequences by $\pm(\pi/4)$.

10. An apparatus comprising:
a dipole antenna to receive first and second input signals of quadrature phase shift keying (QPSK) sequences;
a transformation unit to transform quadrature phase shift keying (QPSK) sequences of the first and second input signals into first and second signals of complex binary sequences; and
a cross-correlator to cross-correlate the first and second signals of complex binary sequences based on a sign bit and a type bit provided by the transformation unit, wherein the cross-correlator includes
an accumulation unit comprising a first accumulator to provide a real cross-correlated signal and a second accumulator to provide an imaginary cross-correlated signal, and
a cross-correlation controller to provide a real component of the first and second signal of complex binary sequences to the first accumulator and an imaginary component of the first and second signal of complex binary sequences to the second accumulator.

11. The apparatus of claim 10, wherein the transformation unit comprises:
a first transformer able to rotate a phase of QPSK sequences of the input signal to provide the type bit and the sign bit of the first signal of complex binary sequences that include real and imaginary components; and
a second transformer able to rotate a phase of QPSK sequences of the second input signal to provide the type bit and the sign bit of the second signal of complex binary sequences that include real and imaginary components.

12. The apparatus of claim 10, wherein the cross-correlator further comprises:

a first multiplier able to multiply the real cross-correlated signal; and
a second multiplier able to multiply the imaginary cross-correlated signal.

13. The apparatus of claim 12 wherein the first and second multipliers are able to multiply the real and imaginary cross-correlated signals by two.

14. The apparatus of claim 11, wherein the first and second transformers are able to rotate the phase of bits of the first and second signals of complex binary sequences by $\pm(\pi/4)$.

15. The apparatus of claim 11, wherein the first and second signals of complex binary sequences comprise values of $\pm A$ and $\pm j \cdot A$.

16. An article comprising: a storage medium having stored thereon instructions that when executed result in:
cross-correlating between a first signal of complex binary sequences and a second signal of complex binary sequences according to a sign bit and a type bit provided by phase-rotating the complex binary sequences of the first and second signals; and
transforming first and second input signals of quadrature phase shift keying (QPSK) sequences into said first and second signals of complex binary sequences, wherein the instruction of transforming when executed further results in:
rotating a phase the QPSK sequences of the first input signal and a phase of the QPSK sequences of the second input signal, and
providing real and imaginary components of complex binary sequences of the first and second signals to first and second accumulators.

17. The article of claim 16, wherein the instructions when executed further result in:
cross-correlating between the complex binary sequences of the first and second signals and multiplying the results of the cross-correlating by two.

18. The article of claim 17, wherein the instructions when executed further result in:
rotating a phase of bits of the complex binary sequences by $\pm(\pi/4)$.

* * * * *

UNITED STATES PATENT AND TRADEMARK OFFICE
CERTIFICATE OF CORRECTION

PATENT NO. : 7,203,253 B2 Page 1 of 1
APPLICATION NO. : 10/254974
DATED : April 10, 2007
INVENTOR(S) : Kobby Pick et al.

It is certified that error appears in the above-identified patent and that said Letters Patent is hereby corrected as shown below:

Column 6

Line 15, "...fist and second..." should read --...first and second...--.

Line 55, "...fist and second..." should read --...first and second...--.

Line 63, "...signals: and..." should read --...signals; and...--.

Signed and Sealed this

Sixteenth Day of September, 2008

JON W. DUDAS
*Director of the United States Patent and Trademark Office*